United States Patent
Hagedorn et al.

(10) Patent No.: US 6,186,019 B1
(45) Date of Patent: Feb. 13, 2001

(54) DRIVE PINION FOR RIM GEAR/PINION DRIVE

(75) Inventors: Alexander Hagedorn, Pulheim; Christoph Troeder, Aachen, both of (DE)

(73) Assignee: KHD Humboldt Wedag, AG, Cologne (DE)

( * ) Notice: Under 35 U.S.C. 154(b), the term of this patent shall be extended for 0 days.

(21) Appl. No.: 09/356,579

(22) Filed: Jul. 19, 1999

(30) Foreign Application Priority Data

Jul. 22, 1998 (DE) .............................. 198 32 933

(51) Int. Cl.⁷ .............................. F16H 57/12; F16D 3/74
(52) U.S. Cl. .............................. 74/411; 464/92; 464/180
(58) Field of Search .............................. 74/411; 464/87, 464/82, 83, 89, 92, 180

(56) References Cited

U.S. PATENT DOCUMENTS

| 2,544,809 | * | 3/1951 | Stanley | 192/48.91 |
| 3,368,419 | * | 2/1968 | Puxkandl | 74/411 X |
| 3,554,045 | * | 1/1971 | Littmann | 74/411 |
| 3,682,015 | * | 8/1972 | Richardson | 74/411 X |
| 4,779,470 | * | 10/1988 | Morita et al. | 74/7 R |
| 4,854,184 | * | 8/1989 | Jessup | 74/411 |
| 5,127,279 | * | 7/1992 | Barthruff | 74/6 |
| 5,452,622 | * | 9/1995 | Fenelon | 74/411 |
| 5,598,749 | * | 2/1997 | Goto | 74/820 |
| 5,607,023 | * | 3/1997 | Palm | 74/411 X |

FOREIGN PATENT DOCUMENTS 0 175 109   1/1990 (EP) .

* cited by examiner

Primary Examiner—Charles A Marmor
Assistant Examiner—Ha Ho
(74) Attorney, Agent, or Firm—Charles L. Schwab; Hardaway/Mann IP Group

(57) ABSTRACT

The pinion (10) on the pin shaft (11) and/or the pinion shaft bearings to either side of the pinion and/or the pinion shaft pillow blocks (12, 13) are supported by elastically deformable components (15, 16, 22, 23) so as to automatically adapt radially in an elastically compliant manner to variations in the meshing of the pinion with the rim gear on the driven rotary drum of a tube mill or the like.

6 Claims, 1 Drawing Sheet

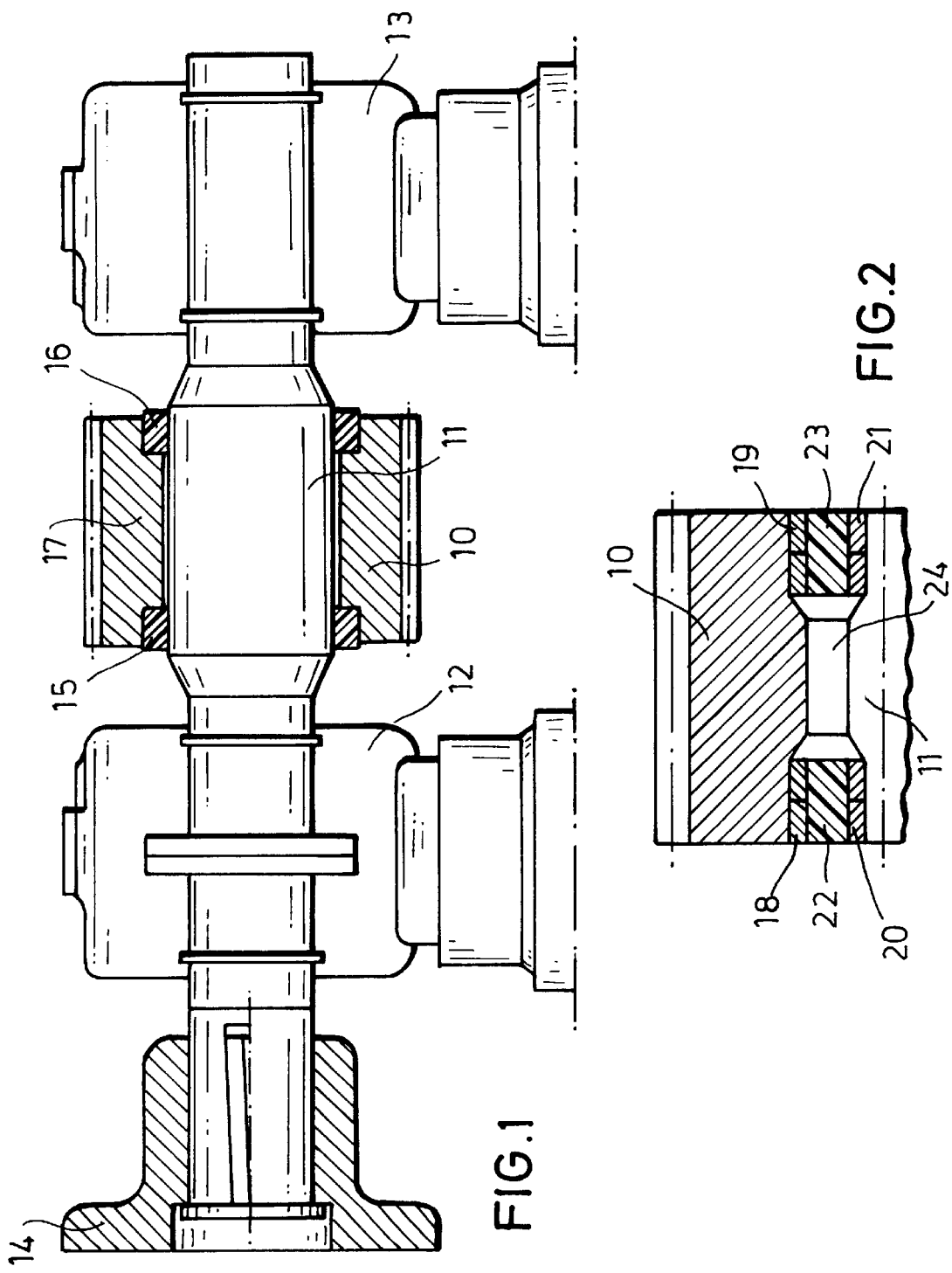

DRIVE PINION FOR RIM GEAR/PINION DRIVE

TECHNICAL FIELD

This invention relates to a drive pinion for a rim gear/pinion drive of rotary drums, such as used in tube mills, wherein the drive pinion meshes with a rim gear on the drum.

BACKGROUND OF THE INVENTION

In European Patent EP 0 175 109 B1, one or two drive pinions mesh with a T-section ring gear rigidly secured to the outside diameter of a drum. Drum flexures can lead to drum distortions, which lead, also in combination with various thermal expansions, to relative displacements and/or inclinations of the tooth flanks with nonuniform face width load behavior, so that the rim gear drive and its transmission of force can be endangered even with hardened tooth flanks. In order to distribute the load transmission in an approximately uniform way over the full face width of the drive teeth and to achieve a somewhat uniform load flank contact pattern, it has heretofore been proposed to use a so-called self-adjusting drive pinion, in which the pinion body is mounted on the pinon shaft with a seat in the form of a spherical cap. Such a pinion mounting can compensate for any alignment errors of the pinion and/or of the rim gear; however, such a pinion is very complicated in design and expensive to manufacture.

OBJECTS AND SUMMARY OF THE INVENTION

It is an object of the invention to create a drive pinion for a rim gear/pinion drive, which is simple in design and automatically adapts to varying operating conditions of the meshing of the pinion with the rim gear of the driven rotary drum.

The drive pinion is made self-adjusting by virtue of the fact that the pinion on the pinion shaft and/or the pinion shaft bearings to either side of the pinion and/or the pinion shaft pillow blocks are compliantly supported by spatially elastically deformable components. The pinion may have recessing in the axially spaced plane faces of the pinion for receiving annular elastically deformable components encircling the pinion shaft. The elastically deformable components support the pinion in elastically springing fashion on the pinion shaft. The drive pinion mounting functions like a ball-and-socket joint, without requiring a complicated design with spherically arched spherical-cap surfaces. By using the spatially elastically deformable pinion components, flank loading is uniformly distributed over the face width of the pinion teeth and uniform tooth trace contact is insured during meshing with the rim gear. Moreover, in contrast to a pinion with a seat in the shape of a spherical cap, the drive pinion is compliant in the radical direction through use of components that are elastically deformable in spring-like fashion. The radial compliance of the elastically deformable components can be set lower than the tooth stiffness of the pinon.

In the pinion of this invention, the transmission of torque can be separated from the transmission of transverse force. For the transmission of torque, a spline like toothing is provided on the pinion and the pinion shaft between the two annular elastically deformable components arranged in the region of the plane pinion faces. The spline like toothing can take the form of internal toothing and external toothing as well as the form of a feather key. The functions of torque transmission and transverse-force transmission can also be combined in one element. In order to achieve this object, the two annular elastically deformable components arranged in the region of the plane pinion faces can be clamped in so-called clamp set fashion between the pinion and pinion shaft.

According to a further feature of the invention, the spatially elastically deformable annular components can, as a structural unit, consist of an elastic busing with a metallic outer ring and a metallic inner ring, between which an elastomer ring of suitable elastic modulus is clamped concentrically.

BRIEF DESCRIPTION OF THE DRAWINGS

The invention and its various features and advantages are hereinafter explained in more detail on the basis of the exemplary embodiments shown in the drawings, in which:

FIG. 1 shows, in vertical longitudinal section, a drive pinion for the rim gear/pinion drive of a tube mill and FIG. 2 shows a portion of a vertical section through a pinion supported on a pinion shaft by elastic bushings.

DETAILED DESCRIPTION OF THE INVENTION

As shown in FIG. 1, the drive structure or pinion 10 is mounted on a pinion shaft 11 which is supported by pinion shaft pillow blocks 12 and 13 disposed at axially opposite sides of the pinion 10. The pinion shaft 11 is supported in the pinion shaft bearing pillow blocks 12, 13 by a bearing structure including pinion shaft bearings. The number 14 designates a flange for the flange connection of the pinion shaft 11 to a gearbox countershaft, not shown, for the pinion drive.

The pinion 10 has external drive teeth and axially spaced recesses formed in its axially opposite plane faces. Annular elastically deformable components 15 and 16 are mounted in the recesses and encircle the periphery of the pinion shaft. The elastically deformable components 15, 16 elastically support the pinion 10 on the surface of the pinion shaft 11. The ring shaped components 15, 16 are elastically deformable, so that the pinion 10 can react compliantly, in spring fashion, to all possible varying operating conditions of its meshing with the rim gear of the tube mill.

Between the two annular elastically deformable components 15 and 16, disposed in recesses in the end faces of the pinion 10, a toothing 17 between pinion 10 and pinion shaft 11 is arranged for torque transmission, which toothing may consist of an internal toothing/external toothing or a feather-key arrangement. In this invention, the transmission of torque and the transmission of transverse force at the pinon 10 are separated. It would, however, also be possible to combine the functions of torque transmission and transverse-force transmission at the pinon 10 in the annular elastically deformable components 15 and 16. The components 15 and 16 would then have to be clamped in so-called clamp set fashion between pinion 10 and pinion shaft 11.

As FIG. 2 shows, the elastically deformable components 15 and 16 of FIG. 1 may, as a structural unit, also consist of an elastic bushing with at least one metallic outer ring 18 or 19 and at least one metallic inner ring 20 or 21, between which, in each case, an elastomer ring 22 or 23 with a suitable elastic modulus is clamped concentrically. The spline like toothing 24 between the pinion 10 and the pinion shaft 11 for torque transmission, shown schematically in FIG. 2, is disposed between the two elastic bushings.

The radial compliance of the two annular elastically deformable components 15, 16, 22, 23, disposed at the plane pinion faces is desirably lower than the drive tooth stiffness of the pinion 10.

What is claimed is:

1. A drive for a rim gear of a rotary drum, said drive comprising:

a pinion (10) with drive teeth meshing with said rim gear and presenting an axial shaft receiving opening, a pinion shaft (11) extending through said opening and drivingly connected to said pinion (10), pinion shaft bearings on said pinion shaft (11) at axially opposite sides of said pinion (10), a pair of pinion shaft pillow blocks (12, 13) supporting said pinion shaft bearings, respectively, elastically deformable components (15, 16, 22, 23) disposed between said pinon (10) and said pinion shaft (11) and spline teeth (17, 24) formed in said opening of said pinion (10) and on said pinion shaft (11), respectively, said spline teeth (17, 24) being disposed axially between said elastically deformable components (15, 16, 22, 23) and being in engagement for transmission of torque.

2. The drive of claim 1 and further comprising annular recesses in axially opposite sides, respectively, of said pinion (10), said recesses housing said elastically deformable components, whereby said pinion (10) is elastically supported on said pinion shaft (11).

3. The drive of claim 2 wherein for the transmission of torque along with the transmission of transverse force, said elastically deformable components are annular and are clamped in so-called clamp set fashion between said pinion (10) and said pinion shaft (11).

4. The drive of claim 1 wherein each of said elastically deformable components are a structural unit forming an elastic bushing including at least one metallic outer ring (18 or 19) and at least one inner ring (21 or 21), between which an elastomer ring (22 or 23) is clamped concentrically.

5. The drive of claim 1 wherein said elastically deformable components are annular and have a radial compliance lower than the stiffness of said drive teeth of said pinion.

6. A drive for a rim gear of a rotary drum, said drive comprising:

a pinion structure (10) with drive teeth meshing with said rim gear and presenting an axial shaft receiving opening, a pinion shaft (11) extending through said opening and drivingly connected to said pinion (10), a bearing structure including pinion shaft bearings on said pinion shaft (11) at axially opposite sides of said pinion structure (10), a pair of pinion shaft pillow blocks (12, 13) supporting said pinion shaft bearings, respectively, elastically deformable components disposed between said pinion shaft (11) and one of said structures, and spline teeth (17, 24) formed in said opening of said pinion structure (10) and on said pinion shaft (11), respectively, said spline teeth (17, 24) engaging for transmission of torque.

* * * * *